Dec. 31, 1963 H. D. THOMPSON 3,115,975
CART UNLOADING MEANS
Filed Feb. 19, 1962 5 Sheets-Sheet 5
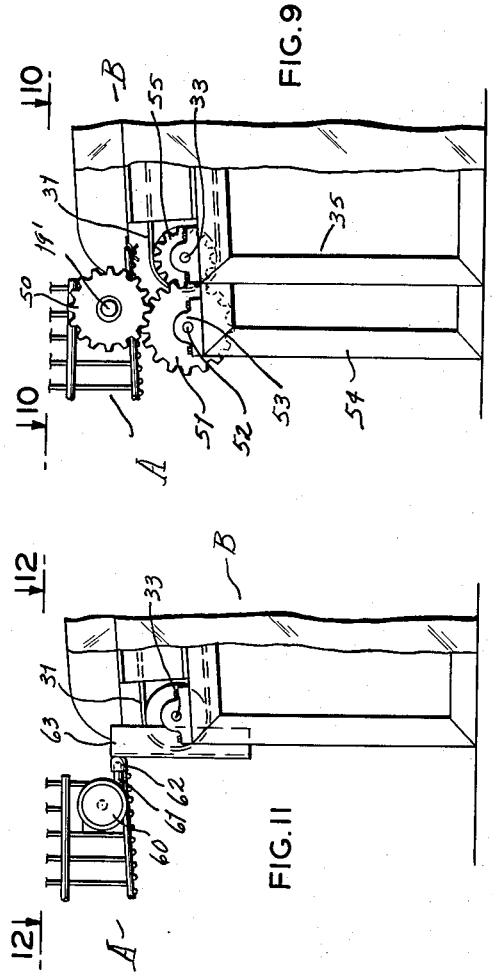
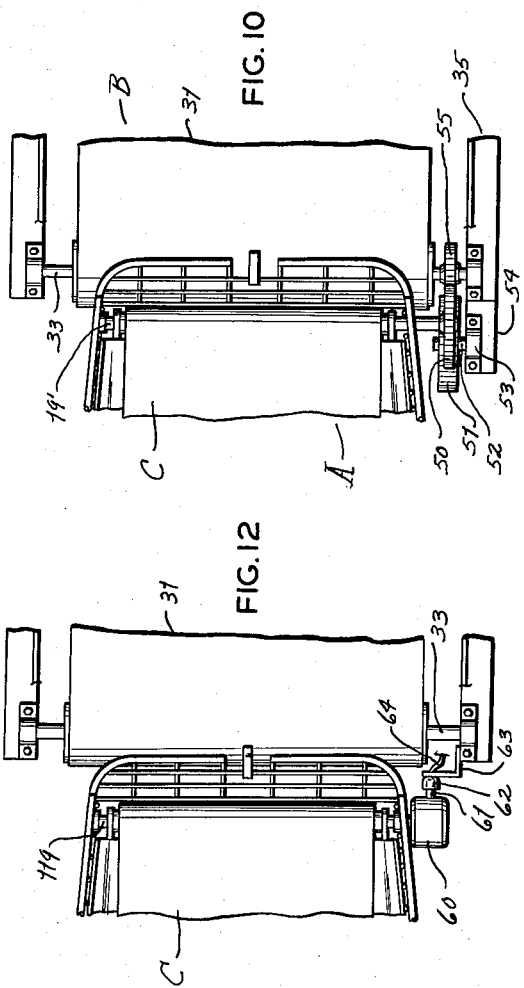
INVENTOR.
HAROLD D. THOMPSON
BY
ATTORNEY

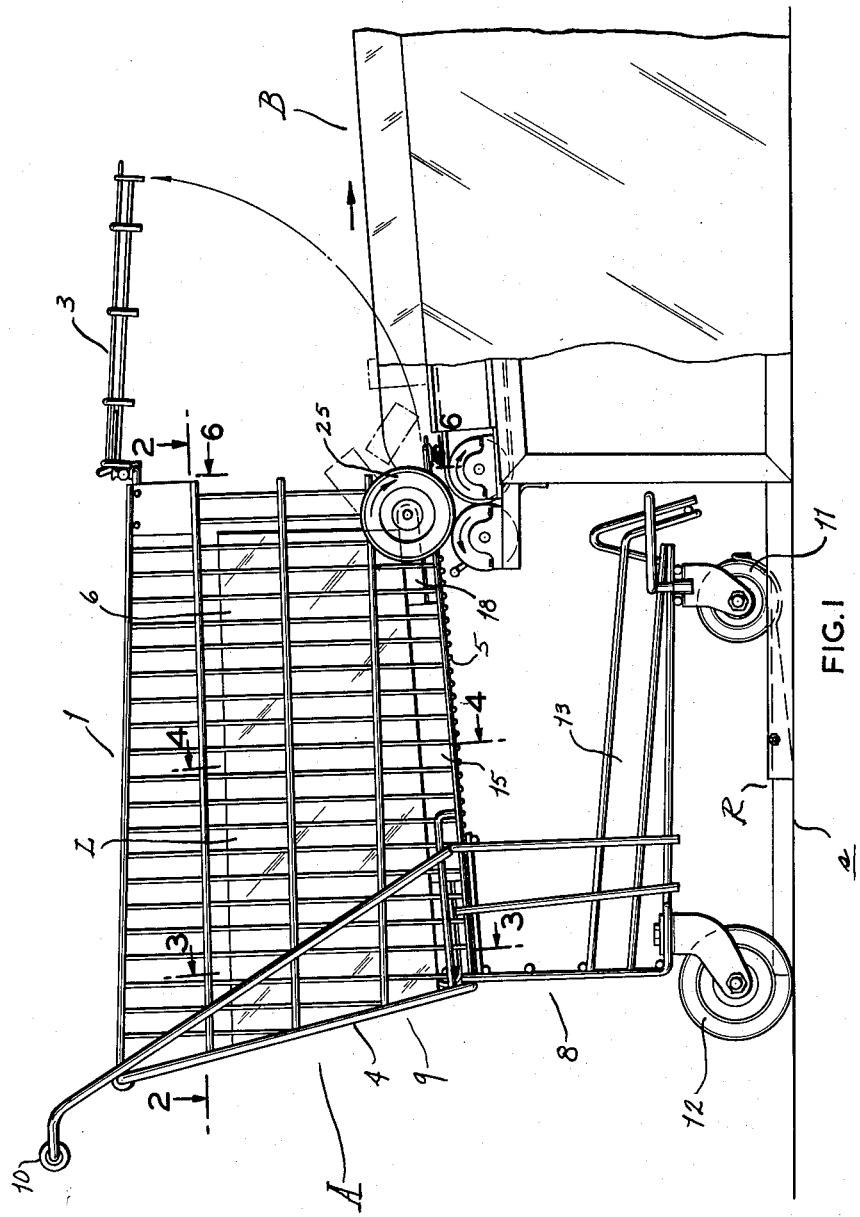

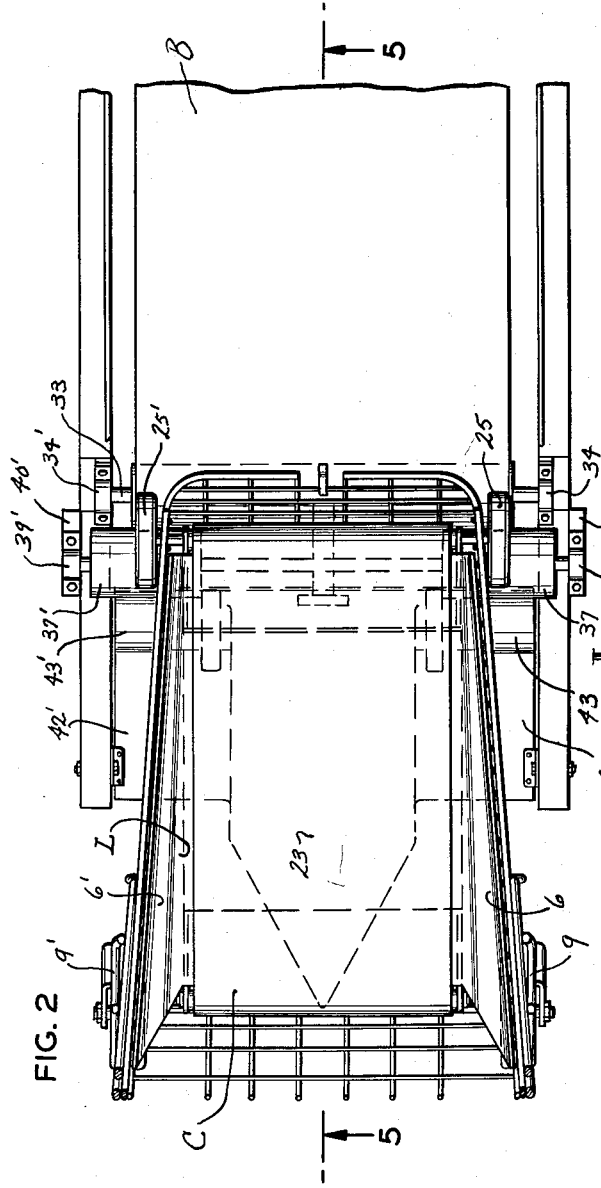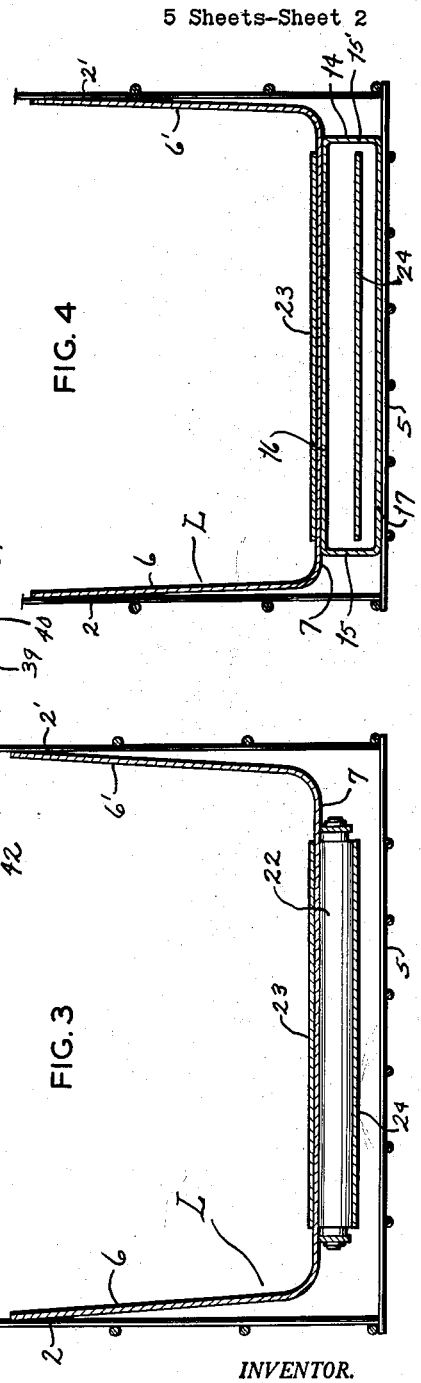

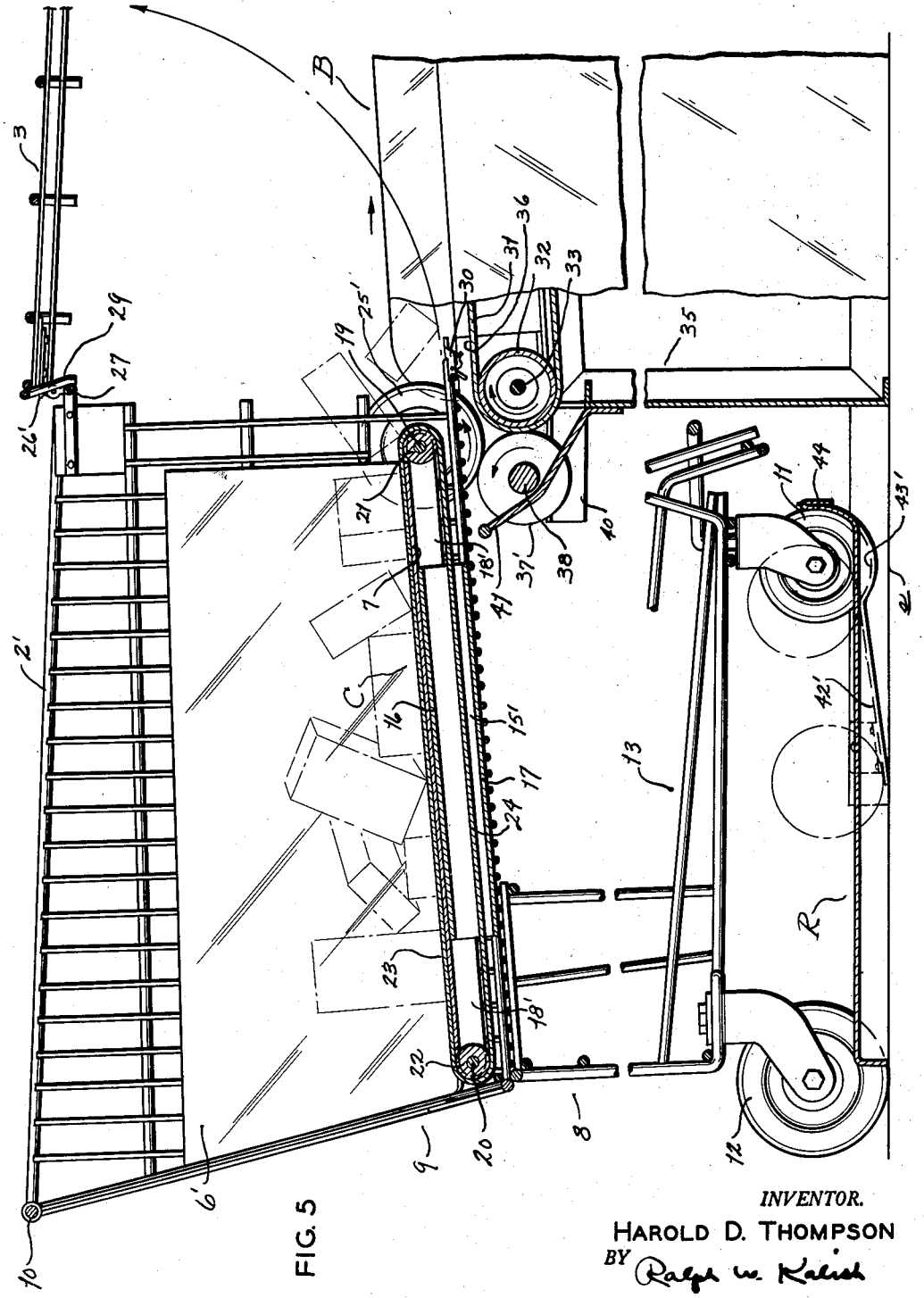

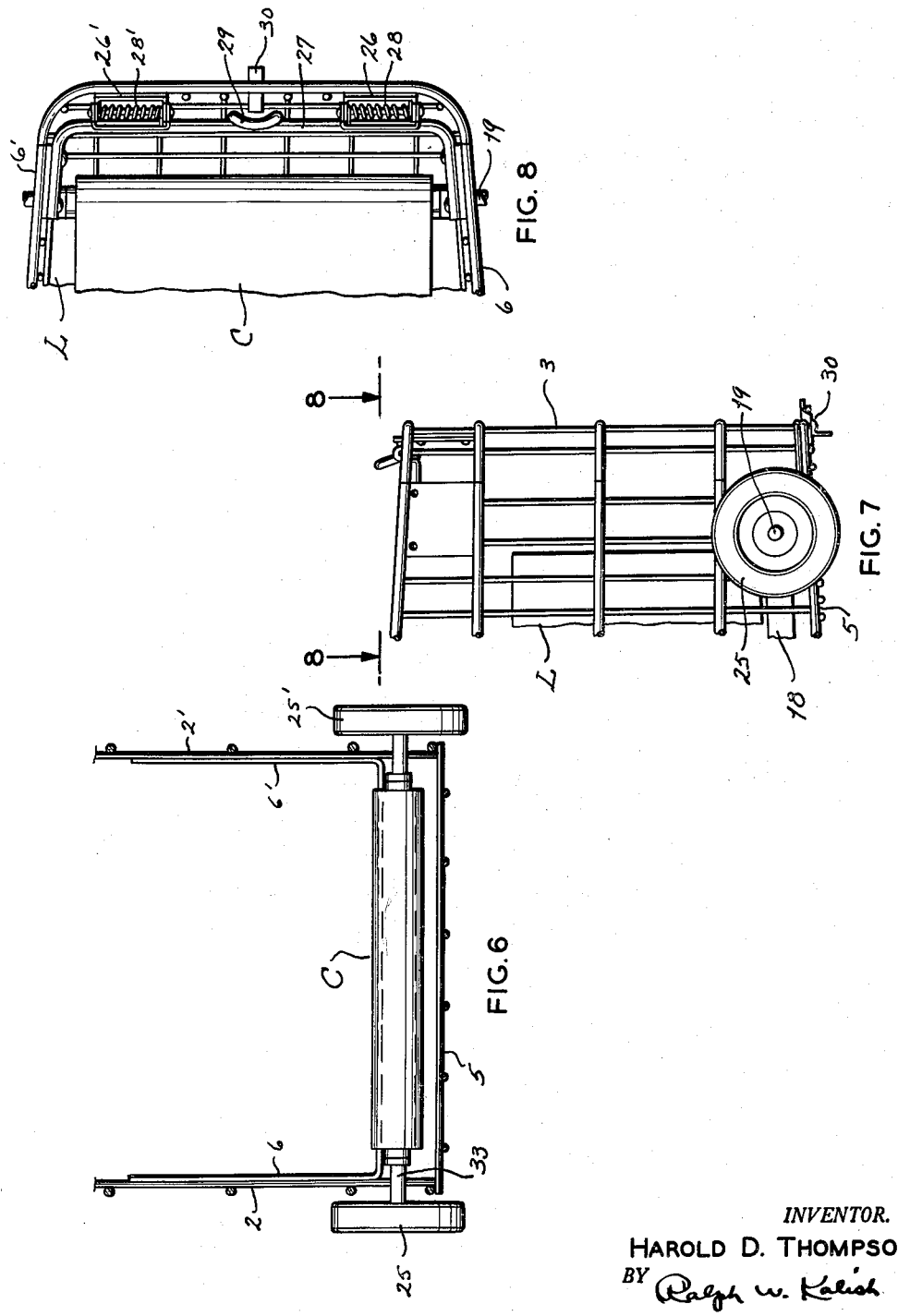

United States Patent Office

3,115,975
Patented Dec. 31, 1963

1

3,115,975
CART UNLOADING MEANS
Harold D. Thompson, Jackson, Tenn., assignor to Piggly Wiggly Corporation, Jacksonville, Fla., a corporation of Delaware
Filed Feb. 19, 1962, Ser. No. 174,179
5 Claims. (Cl. 214—44)

This invention relates in general to conveying systems, and, more particularly, to such systems incorporating a mobile unit and designed for the unloading of the contents thereof.

Presently in large retail establishments, such as, the well-known "supermarkets," discount houses, and the like, wherein merchandise selection is effected by self-service, there is an ever increasing use of easily maneuverable carts by which a shopper may transport a multiplicity of individual items selected to what is commonly known as a check stand or check-out counter, for the tallying of, and the charging for, the chosen merchandise. Heretofore, numerous unsuccessful efforts have been made to develop means for facilitating the unloading and transfer of the selected items from such carts to the check-out counter, which objective is most desirable for several reasons; one being to speed the checking-out operation so that the waiting time for customers will be materially reduced; and another, being to relieve the customer and the checker of the physical exertion requisite for the manual transfer of such items, which presents a severe fatigue problem for checkers, requiring frequent rest periods and with the costly necessity of the services of alternating personnel.

Therefore, it is an object of the present invention to provide means for the automatic transfer of articles from a mobile unit, such as, a shopper's cart, to a permanently positioned receiving member, such as, a store check counter.

It is another object of the present invention to provide an automatic system for the unloading and transfer of items from a mobile unit such as, a cart, to a receiving counter, which may be readily utilized in conjunction with existing cart and counter constructions.

It is an additional object of the present invention to provide a unique conveying system for the purpose stated comprising a simplicity of parts which are durable and reliable in operation, rendering said system resistant to breakdown and hence, peculiarly adapting same for relatively careless usage by unskilled individuals.

It is a further object of the present invention to provide an unloading and transfer means for a cart or other mobile unit comprised of a conveyor having one section mounted upon a stationary member, as a counter, and another cooperating section provided on a cart with uniquely contrived motion transmitting means between the same; which conveyor may be economically produced; and the use of which will substantially accelerate the checking and merchandise-charging procedure in self-service stores, conducing to increased patronage and effecting marked economies in operation.

Other objects and details of the invention will be apparent from the following description, when read in connection with the accompanying drawings (five sheets), wherein—

2

FIGURE 1 is a side view of a shopper's cart and counter equipped with cooperating article unloading and transferring means constructed in accordance with and embodying the present invention.

FIGURE 2 is a horizontal transverse section taken on the line 2—2 of FIGURE 1.

FIGURE 3 is a vertical transverse section taken on the line 3—3 of FIGURE 1.

FIGURE 4 is a vertical transverse section taken on the line 4—4 of FIGURE 1.

FIGURE 5 is a vertical transverse section taken on the line 5—5 of FIGURE 2.

FIGURE 6 is a vertical view taken on the line 6—6 of FIGURE 1.

FIGURE 7 is an enlarged fragmentary side elevational view of the front end of the cart, showing the same in closed condition.

FIGURE 8 is a horizontal view taken substantially on the line 8—8 of FIGURE 7.

FIGURE 9 is a fragmentary side view of the adjacent ends of the cart and counter, showing another form of the present invention.

FIGURE 10 is a fragmentary top plan view taken on the line 10—10 of FIGURE 9.

FIGURE 11 is a fragmentary side view of the adjacent ends of the cart and counter showing a further form of the present invention.

FIGURE 12 is a fragmentary top plan view take on the line 12—12 of FIGURE 11.

Referring now by reference characters to the drawings which illustrate preferred embodiments of the present invention, A generally designates a cart or truck of the type utilized for collection and transportation of matter, and having wide application in self-service retail establishments, such as, markets, department stores, and the like, for articles of merchandise selected by a shopper; and B broadly indicates a stationary counter, as customarily located proximate the exit of a self-service store for the purpose of receiving the selected merchandise from cart A for the checking or tallying thereof.

Although the present invention is adapted for broad industrial and commercial usage, the same, for purposes of illustration only, is described hereunder with reference to the retail field, and thus such description should not be construed in a limiting manner. Cart A may be of any specific construction such as of the familiar heavy wire or rod construction so customarily used for shopper's carts, incorporating an upper receptacle or basket 1, being open to the top and having side walls 2, 2', forward and rearward end walls, 3, 4, respectively, and a bottom wall 5. Said basket 1 is of suitable height for retainingly receiving a substantial quantity of discrete articles of merchandise selected by the cart user, and is forwardly tapered so that forward end wall 3 is of less height than rearward end wall 4, with the bottom wall 5 being slightly forwardly and upwardly inclined with respect to the horizontal. The said taper is dictated solely by the peculiar design of the baskets to permit nesting thereof when not in use. But, for the purposes of the present invention, the said cart may be devoid of such taper since the same does not form a part of the present invention.

For purposes presently appearing, there is provided interiorly of basket 1, and secured therein by any suitable means such as spot welding, a liner L, preferably of sheet metal, of general U-shape in cross-section, being formed to provide a pair of upwardly extending side sections 6, 6' and an intervening horizontal base plate 7. Said side sections 6, 6', being slightly downwardly and inwardly inclined, are disposed in immediate adjacency to basket side walls 2, 2'; and base plate 7 overlies bottom wall 5, in elevated relation thereto; said base plate 7 projecting at its ends beyond the end edges of side sections 6,6'. Said cart A embodies a carriage portion 8 having upright side assemblies 9, 9' at the upper ends of which there is disposed a rearwardly located transverse handle or push bar 10, and at the lower end incorporates pairs of front and rear rollers or casters 11, 12 respectively. Said carriage 8 may be provided with a lower article-carrying compartment, as at 13.

Presented between the underside of base plate 7 and basket bottom wall 5 is an open ended tunnel-like housing 14, being rectangular in cross-section, having parallel side walls 15, 15', a top wall 16, and a lower wall 17; said housing 14 being secured against accidental displacement as by welding to base plate 7. Side walls 15, 15' are each provided at their opposite ends with extensions 18, 18' respectively which project beyond base plate 7, at each end thereof, and said extensions at their extremities are alignedly apertured for journalling therethrough of the ends of corresponding forward and rearward, axially parallel shafts 19, 20 respectively. Said shafts 19, 20 mount rollers 21, 22 for disposition thereabout of an endless conveyor belt C, the upper course 23 of which extends over and lengthwise of base plate 7 and the lower course 24 thereof moves beneath base plate 7 and through housing 14 (see FIGURES 4 and 5). Forward shaft 19 projects at its ends through openings in the general mesh character of the adjacent side walls 2, 2' (see FIGURE 6) for projection laterally outwardly of basket 1 and at each of its ends mounts a friction roller 25, 25', having a smooth peripheral surface.

Forward wall 3 is adapted to form a front end closure for basket 1, by being hingedly mounted by a pair of spaced apart hinges 26, 26', at its upper end through a transverse support member 27 extending between the upper forward ends of side walls 2, 2'; said hinges 26, 26' being each provided with a coil spring 28, 28', respectively, for biasing said forward wall 3 into upperly swung, open relation as shown in FIGURE 1. A detent 29 is fixed on transverse 27 to limit upward swinging movement of forward wall 3. Mounted centrally on the forward end of bottom wall 5 of basket 1 is a spring hook latch arm 30 adapted for engaging the lower confronting portion of forward wall 3 when the same is presented thereto whereby said front end wall may be maintained in closed relationship, against the bias of springs 28, 28'. Said latch arm 30 is so designed that upon the application of downwardly directed pressure thereon the same will be removed from engagement with forward wall 3 to thereby free the same for upward swinging, under urging of hinge springs 28, 28'.

As may be seen in FIGURE 5, counter B is provided with an endless conveyor belt 31 extending axially thereof and being trained about spaced apart, cooperating rollers which have like construction and character; the outer one, shown at 32, is mounted upon a shaft 33, journalled in aligned bearings 34, 34' suitably supported on the end portion of frame 35 of said counter B. Conventional drive means (not shown) may be easily energized by operation of a switch (not shown) located conveniently to the checker or counter attendant to effect travel of conveyor belt 31 with the upper course 36 thereof moving toward the attendant, away from the outer end of said counter B, in the direction indicated by the arrow in FIGURE 1. Frictionally engaging the outer rearward end surface of conveyor belt 31, adjacent its ends, are idler rollers 37, 37' carried in longitudinally spaced apart relationship upon a shaft 38 journalled at its ends in bearings 39, 39', fixed upon side extensions 40, 40' respectively of counter B. Shaft 38 is axially parallel to shaft 33, but is disposed slightly downwardly thereof in general conformity to the slight outward and downward inclination of conveyor belt 31. Idler rollers 37, 37' extend at their outer ends beyond the proximate end of conveyor roller 32. Thus, upon operation of conveyor belt 31, through frictional engagement therewith, idler rollers 37, 37' will be caused to rotate in a direction opposite to that of the conveyor supporting roller 32, as shown by arrows in FIGURE 5.

Secured on the end of frame 35 of counter B is the inner end of an elongated, inclined cam member 41, which extends upwardly and outwardly between the inner ends of idler rollers 37, 37' for contact by latch arm 30 as cart A is presented to counter B in a manner to be described hereinbelow. By such contact and with continued engagement through movement of cart A, said cam 41 will cause latch arm 30 to be deflected downwardly for losing locking relation with forward wall 3 so that the latter will under spring pressure spring upwardly into open position. Presented upon the support surface s, adjacent to the outer end of counter B is a cart positioning and retaining member R as formed of said metal and incorporating a pair of upwardly inclined ramp-like guideways 42, 42' for cart rollers 11; said guideways 42, 42' communicating at their forward ends with upwardly concave transversely spaced depressions 43, 43'; there being detents 44 forwardly of said depressions to prevent further travel of cart A.

In usage, with cart A containing selected articles of merchandise, as indicated in phantom lines in FIGURE 5, the user will push the forward end of said cart endwise toward the outer end of counter B and in so doing will cause front rollers 11 to travel within and upwardly along guideways 42, 42' of member R, for disposition of said front rollers 11 into depressions 43, 43' as shown in FIGURES 1 and 5 wherein the further movement of cart A is inhibited and the same is then presented to counter B for the unloading operation. It will be seen that with rollers 11 disposed at the upper end of guideways 42, 42', the said forward end of cart A will be raised so as to allow friction rollers 25, 25' to be presented slightly above idler rollers 37, 37' whereby upon further travel of cart A with rollers 11 moving downwardly into depressions 43, 43' the said friction rollers 25, 25' will be moved correspondingly forwardly and then lowered for being brought into peripheral engagement with idler rollers 37, 37' respectively; it being especially noted that the vertical center lines of friction rollers 25, 25' are forwardly of idler rollers 37, 37' so as to assure maintenance of operative relationship therebetween. It is apparent that if friction rollers 25, 25' engaged said idler rollers 37, 37' in their outer portions there would be a tendency for a parting action therebetween. Cart positioning and retaining member R thus serves multiple purposes in that it stabilizes the cart against undesired movement or displacement as well as assuring that friction rollers 25, 25' will be brought into proper and effective relationship with idler rollers 37, 37' for motion transmission.

As evident from the foregoing, latch arm 30 will have been deflected by cam member 41 as cart A is moved toward counter B so that front wall 3 will automatically swing upwardly to allow free movement of the cart contents through said forward end.

With conveyor belt 31 of counter B operating and roller 32 rotating in the manner indicated by the arrow, idler rollers 37, 37' will, perforce, rotate in the opposite direction as indicated. Friction rollers 25, 25' will accordingly be caused to rotate, through their engagement with idler rollers 37, 37', in the same direction as roller 32 so that the upper course 23 of conveyor C of cart A will travel in the same direction as the upper course of conveyor 31 of counter B. Thus, with conveyor C operating, the merchandise carried thereon will be delivered to the forward open end of cart A and the same will drop thence downwardly onto conveyor 31 for delivery to the attendant or checker. Upon termination of the unloading operation the user need merely pull downwardly on the pushbar 10 of cart A so as to elevate rollers 11 from depressions 43, 43', thereby simultaneously removing friction rollers 25, 25' from operative engagement and then cart A may be withdrawn by return travel of rollers 11 down guideways 42, 42'. Front end wall 3 may be easily closed by simply forcing same downwardly to allow latch arm 30 to be restored to engagement.

From the foregoing it will thus be seen that the unloading of cart A is easily and simply effected, obviating any physical exertion on the part of the cart user or the attendant for unloading and transmitting the merchandise for accurate checking. The novel motion transmitting means are very durable and resistant to breakdown so that the normally expected careless handling will be unlikely to cause damage. Furthermore, the present invention is so uniquely contrived that positive operative engagement is reliably effected regardless of the lack of skill on the part of the cart user.

Another form of motion transmitting means between the conveyors of counter B and cart A is shown in FIGURES 9 and 10. It will be seen that the forward shaft of conveyor C, as indicated at 19', projects at one of its ends laterally outwardly of basket 1 and on its extremity carries a pinion 50, which is disposed, when cart A is suitably positioned within member R, for engagement with an idler gear 51 mounted upon a stud shaft 52 which is journalled in bearing 53 fixed on a side extension 54 of frame 35 of counter B which is in all respects structurally similar to counter B above described but is devoid of idler rollers and associated structure. Idler gear 51 meshes with a drive gear 55 keyed or otherwise carried upon shaft 33 of counter B. The operation of this system should be quite apparent from the foregoing since the member R will assure of the appropriate relationship of pinion 50 and idler gear 51 with the vertical center-line of the former being forwardly of that of the latter and with conveyor C of cart A being driven by the gear train described.

Referring now to FIGURES 11 and 12, a further form of the present invention is illustrated. Therein, the forward shaft, as indicated 119, of conveyor C of cart A, projects at one of its ends beyond the side will of basket 1 and is drivingly connected to a small motor 60 suitably supported from cart A. Operatively engaged to, and connected with, said motor 60 is a forwardly projecting conductive plug 61 being presented for circuit-closing reception within a socket 62 mounted on an arm 63 fixed on the end of frame 35 of counter B. Socket 62 is connected, as by a lead 64, to a source of electrical energy so that upon reception of said plug 61 therein energizing current is presented motor 60 for operation thereof with subsequent rotation of drive shaft 119 and travel of conveyor C. Thus, it is apparent that the alignment of plug 61 and socket 62 may be easily assured by a cart positioning and retaining member similar to that described hereinbefore and designated R but which may be devoid of any ramp and associated depression.

From the foregoing it is apparent that the present invention contemplates automatic means for the unloading and transfer of articles from a mobile unit to a stationary member. The modifications of the invention shown hereinabove illustrate that the power for such system may be provided from the stationary member and transmitted by suitable means to the conveying member of the cart.

It is evident that the present invention may be readily adapted for utilization with existing structures, not necessitating new construction and thus may render automatically unloadable presently used carts which were originally designed for manual unloading.

It should be understood that changes and modifications in the formation, construction, arrangement, and combination of the several parts of the cart unloading means may be made and substituted for these herein shown and described without departing from the nature and principle of my invention.

Having thus described my invention, what I claim and desire to secure by Letters Patent is:

1. An unloading system for mobile units comprising a stationary member, a first conveyor mounted on said stationary member and having an outer end, means for driving said first conveyor, a mobile unit adapted for collection and transportation of material, a second conveyor mounted on said mobile unit, an idler member on said stationary member in operatively engaged relation to said first conveyor and being located outwardly of the outer end of said first conveyor, a motion transmitting member mounted on said mobile unit and operatively engaged to said second conveyor, positioning means for maintaining said mobile unit in stable relation to said stationary member for alignment of said first and second conveyors, and guide means associated with said positioning means for sequentially elevating and lowering that portion of said mobile unit carrying said motion transmitting member for presenting same in engagement with said idler member at a point on the portion thereof proximate said first conveyor.

2. An unloading system for mobile units as defined in claim 1 and further characterized by said idler member comprising a roller adapted for rotation about an axis normal to the axis of travel of said first conveyor, and said motion transmitting member comprising at least one roller member.

3. An unloading system for mobile units as defined in claim 1 and further characterized by said idler member comprising a first gear and said motion transmitting member comprising a second gear in meshing relationship with said first gear.

4. An unloading system for mobile units comprising a stationary member, a first conveyor mounted on said stationary member and adapted for axial travel thereof, said first conveyor having an outer end, means for driving said first conveyor, a mobile unit adapted for collection and transportation of material having a receptacle portion, a second conveyor provided in the receptacle portion of said mobile unit and adapted for travel axially thereof, said second conveyor extending from the rearward portion to the forward end of said mobile unit, an idler roller mounted on said stationary member beyond the outer end of said first conveyor and being adapted for rotation about an axis normal to the axis of travel of said first conveyor, a roller member mounted on said mobile unit adjacent the forward end thereof and operatively engaged to said second conveyor, positioning means for maintaining said mobile unit in stable relation to said stationary member for alignment of said first and second conveyors for movement of material from the latter to the former, and guide means associated with said positioning means for sequentially elevating and then lowering the forward end portion of said mobile unit for bringing said roller member into engagement with said idler roller at a point downwardly of the uppermost portion of the said idler roller and on the side thereof proximate said first conveyor.

5. An unloading system for mobile units comprising a stationary member, a first conveyor mounted on said stationary member and adapted for axial travel thereof, said first conveyor having an outer end, means for driving said first conveyor, a mobile unit adapted for collection and transportation of material having a receptacle portion, a second conveyor provided in the receptacle portion of said mobile unit and adapted for travel axially thereof, a drive gear operatively engaged to said first conveyor adjacent the outer end thereof, an idler gear meshing with said drive gear and being carried on said stationary member outwardly of the outer end of said first conveyor, a pinion mounted on said mobile unit and operatively engaged to said second conveyor laterally of the forward end thereof, positioning means for maintaining said mobile unit in stable relation to said stationary member for alignment of said first and second conveyors for travel of material from the latter to the former, and guide means associated with said positioning means for sequentially elevating and then lowering the forward portion of said mobile unit for presenting said pinion in meshing relation with said idler gear on the portion thereof proximate said drive gear and downwardly from the uppermost point of said idler gear.

References Cited in the file of this patent

UNITED STATES PATENTS

| | | |
|---|---|---|
| Re. 12,620 | Slick | Mar. 19, 1907 |
| 2,045,566 | Berg | June 30, 1936 |
| 2,338,359 | Sharp | Jan. 4, 1944 |
| 2,406,992 | Butler | Sept. 3, 1946 |
| 2,467,354 | Baldwin | Apr. 12, 1949 |
| 2,810,467 | Bogarty | Oct. 22, 1957 |
| 3,036,722 | Sharaway | May 29, 1962 |

FOREIGN PATENTS

| | | |
|---|---|---|
| 466,079 | Germany | Sept. 28, 1928 |